Figure 1:
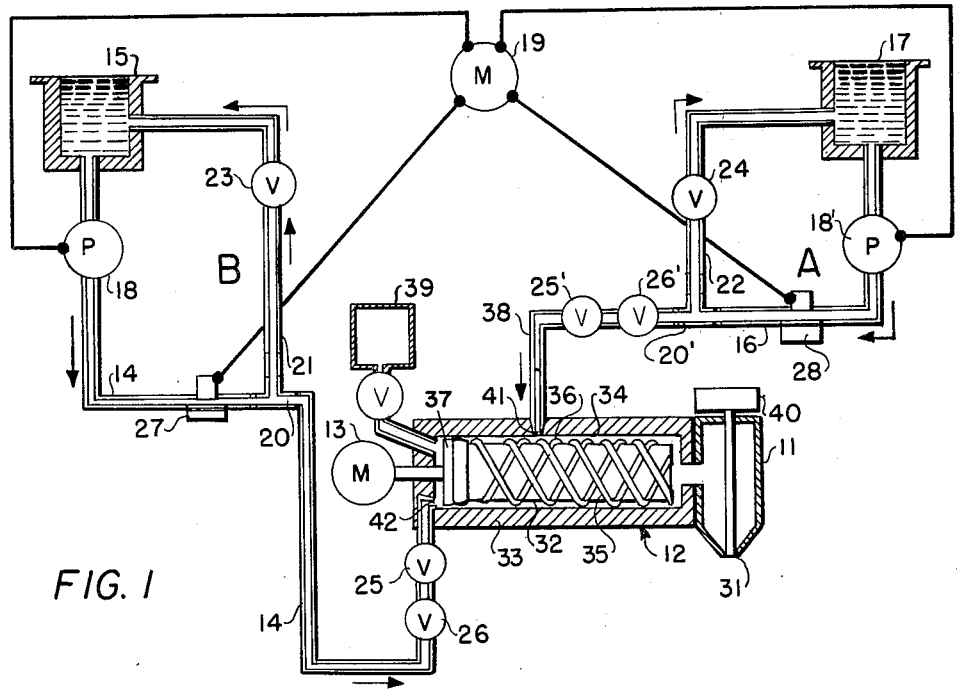

Dec. 11, 1962 S. R. BALLOU ETAL 3,067,987
TWO-COMPONENT MIXER
Filed June 19, 1959

United States Patent Office 3,067,987
Patented Dec. 11, 1962

3,067,987
TWO-COMPONENT MIXER
Sidney R. Ballou, Lexington, and David G. Greenlie, Weston, Mass., assignors to W. R. Grace & Co., Cambridge, Mass., a corporation of Connecticut
Filed June 19, 1959, Ser. No. 821,535
4 Claims. (Cl. 259—7)

This invention relates to the lining of closures with sealing compositions. More specifically, it relates to the dispensing of multi-component sealing composition into closures, and includes the proportional metering of the individual components and their mixing prior to the dispensing of the composition.

The process of placing a sealing composition in an individual closure is known as "lining." This operation is carried out by a machine which essentially consists of a revolving chuck that receives the closure part and spins it beneath a nozzle through which a fluid multi-component composition is flowed into the closure. The operation is generally carried out at a repetitive rate which is fairly rapid because, in some instances, 200 or more closures must be lined in a single minute. Many complications often arise because of the exacting nature of the procedure. For one thing, a constant volume of sealing material must be applied to each individual closure in a batch. For another, the flow of the composition is necessarily subject to quick starts and stops because of the repetitious nature of the operation. The flow of the lining material, however, during the period a closure is being lined must be continuous and the material must be dispensed at a predetermined uniform rate all the way around the closure. Also the point at which the lining forms a joint with itself must be controllable. Other complications often arise because the compositions which are used to line the closures are multi-component compounds, many of which are subject to very fast curing rates after their individual components are mixed and may set up or harden in a short time. It has been found that rigid controls must be had, not only on the rate of mixing of the components of the composition, but also on the time the mixed composition dwells in the mixer. Accurate proportioning of the components in the mix is also a critical factor, influencing the pot life of the mix, the development of full cures, and the uniformity of lining from closure to closure. It is apparent that this operation requires a system which is refined, precise, and controllable.

Industry has devised various systems by which the components of a multi-component mix may be metered, mixed, and then dispensed as a multi-component composition. One system which is used stores the mixed composition in a reservoir and dispenses it under pressure. The composition obviously must not be of the nature which will harden up a short time after its components are mixed. It is also necessary in this case to shut down the system in order to recharge the reservoir. Another system stores the individual components in separate reservoirs, mixes them just prior to use and then dispenses them under slight pressure as a multi-component composition. The time required to bring rotary pumps up to speed and achieve full delivery is appreciable. Non-uniform rate of deposit in the closure is the consequence. Reciprocating pumps mechanically coupled together to maintain synchronism would be effective but for the fact that such systems lose pressure during the time the pistons reach the end of their strokes and change direction. Again, the result is a delivery rate other than desired from the dispensing nozzle—in this case inadequate delivery.

This invention comprises a system wherein the individual components of a multi-component mix are continuously circulated in independent systems at rates which are substantially constant, these rates being in a fixed ratio to each other which is predetermined by the properties of the mix. During lining, these components are individually dispersed into a mixing chamber at these same rates. They are thoroughly mixed therein and subsequently deposited as a homogeneous sealing material into a closure by means of an intermittently operated dispensing valve. The sum of the rates at which the individual components are circulated in their respective systems or dispersed into the mixing chamber is substantially equal to the rate of flow of the mixed material through the dispensing valve. The rate of flow of the mixed material is predetermined by the nature of the closure, by the dimensional properties required of the sealing compound deposit in that closure, and by the repetitive rate at which the closures are to be lined.

In general, the system comprises a mixing unit equipped with an intermittently operated dispensing valve, two independent feed units each of which interconnect a separate reservoir to the mixing unit, and two bypass returns with control valves, each of which interconnect the separate reservoirs with the individual feed units leading therefrom.

Referring now to FIGURE 1, a dispensing valve 11 is connected to a mixer 12 which is driven by a motor 13. A feed line 14 interconnects a reservoir 15 with the mixer 12, while a feed line 16 interconnects a reservoir 17 with the same mixer 12. The material in the feed line 14 is moved therethrough by means of a constant displacement pump 18', while the material in feed line 16 is moved therethrough by constant displacement pump 18. Pumps 18 and 18' are synchronized by a common drive motor 19, as illustrated in FIGURE 1; they may be driven, however, by separate motors having an essentially constant speed ratio. A bypass return line 21 interconnects the reservoir 15 with the feed line 14, and bypass return line 22 interconnects reservoir 17 with feed line 16. The junction 20 between the feed line 14 and the bypass return line 21, is at a point in close proximity to the mixer unit 12. In a similar manner the junction 20' between the feed line 16 and the bypass return line 22 is at a point in close proximity to the same mixer 12. Bypass return line 21 is adapted with a return valve 23 which regulates the delivery of material to the reservoir 15, and the bypass line 22 is adapted with a return valve 24 which regulates the delivery of material to reservoir 17. Valves 23 and 24 are preferably adjustable needle valves. Also feed line 14 is adapted with check valve 25 and shut off valve 26, while in a similar manner feed line 16 is adapted with check valve 25' and shut off valve 26', which may be an adjustable shut off needle valve.

Figure 2:
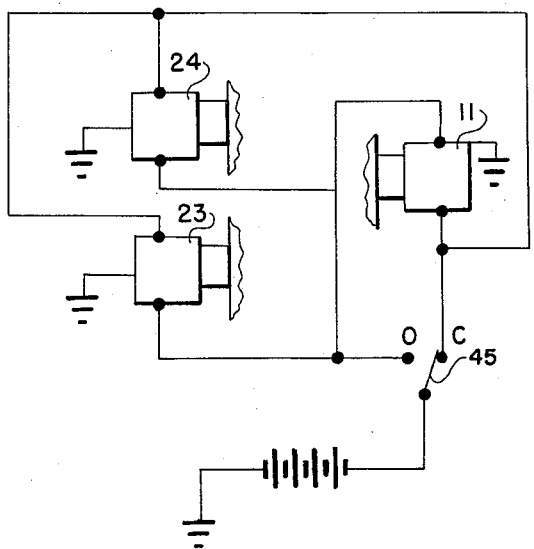

When the return valves 23, 24 on the bypass lines 21, 22 are open, the material which is moved through the feed lines will be propelled into the bypass return lines. In other words, each of the materials will be propelled in an independent flow circuit: i.e., from its reservoir, through the feed line, thence to the bypass return and back to the reservoir. During this period, the dispensing valve on the mixer will be closed. When the dispensing valve 11, however, is open, the material will be propelled from the circuit, into the mixer and thence out through the dispensing valve. During this latter period, the return valves on the bypass lines will be closed, thus shutting off the flow through the bypass returns. It is also to be noted that when the system is operating the check valves 25 and 25' are in the operative position and the shut off valves 26 and 26' are open. This operation depends on a sequence of synchronized movements by the dispensing valve 11 on the mixer 12 and the return valves 23 and 24 on the bypass return lines. The latter valves are "out of phase" with the former valve: i.e., when valves 23 and 24 on the bypass lines are open, the valve 11 on the mixer will be closed; and vice versa, when the dispensing valve 11 on the mixer is open, the valves 23 and 24 on the bypass return lines will be closed. This may be accomplished electrically as illustrated in FIGURE 2, which is an electrical schematic diagram. A battery (as shown) of the correct voltage and output rating supplies power to control valves 11, 23, and 24, each of which is equipped with a solenoid. The circuit between the battery and each of the solenoids is completed by a ground on one side and a wiring connection on the other, as illustrated in FIGURE 2. When switch 45 is in the closed or C position, as shown, the primary solenoids in the various valves are activated by the current from the battery. Dispensing valve 11 closes and simultaneously the bypass return valves 23 and 24 open. As a result, the individual components are returned to their respective tanks. If the switch is moved to the O or open position, the solenoids in several valves are activated in such a way that dispensing valve 11 opens and return valves 23 and 24 close. As a result, the individual components will be directed to the mixer and dispensed through valve 11. It is to be noted, however, that the synchronized movements of these valves may also be accomplished hydraulically, or even manually.

The sum of the rates of flow of the individual components, when they are circulating in their individual flow circuits, is equal to the instantaneous rate of flow of the composition required to be dispensed from the mixer. The rate of flow of the individual components, in their independent flow circuits A and B, are in fixed ratio to each other in accordance with the mix proportions desired. This fixed ratio is maintained by moving the material through the flow circuit by means of constant displacement pumps 18 and 18'. These pumps are driven through reduction drives by a common motor 19. The speed of this motor is constant but may be adjusted to adjust the sum of the flow rates in accordance with the flow rate requirement of mixed material into the closure. In the alternative, these pumps may be driven through suitable reduction drives by individual induction motors having the same power system so that the pumps will remain in synchronism. Adjustment of the sum flow rate is then effected by proportional adjustment of the individual reduction drives to maintain the ratio of the flow rates constant. As an added precaution, the individual feed lines 14, 16 are each provided with a pressure sensitive device 27 and 28 respectively. The function of this device is purely as a high pressure limiting check: if for any reason the pressure in the system exceeds a pre-set safe value, the pressure sensitive device will operate to shut off the pumps.

There are a number of pressure changes which may be noted in a system of this type wherein the flow of a material is diverted from one flow path to another. While the material is flowing in one circuit, a steady state with respect to pressure may be built up in the system. When this flow of material is diverted to a new circuit a transient pressure differential will be noted at the point of diversion of the material. Some of the pressure differential may be due to the elastic nature of the circuit, the cross section and length of the circuit, changes in viscosity of the material (either because of changes in temperature or due to non-Newtonian rheology), and the amount of back pressure in the system itself. In any case, the period of time that is required for the system to stabilize itself at a steady pressure is a function of a factor called the hydraulic time-constant. The time-constant of the bypass lines should be substantially less than the time interval between the time the dispensing valve 11 closes and the time this valve is opened again. The time-constants of the feed circuits, between the junctions 20, 20' of the flow paths and the mixer should be substantially less than the time duration during which each shot of material is actually being dispensed from the dispensing valve. These time-constants have been minimized in the present system by minimizing its volumetric content relative to flow rate: i.e. by minimizing the distance between the junctions 20, 20' and the mixer 12, and in another, the distance between the junctions 20, 20' and the reservoirs 15, 17. As an added precaution a somewhat rigid circuit is used between these aforementioned points to minimize elastic yield, and the back pressure in the system is carefully regulated. The effects of hydraulic time-constants in this system are therefore relatively small and as a result the duration of any transient pressure differential will be negligibly small.

In many cases it is important that the composition remain in contact with the mixing chamber for only a very short period of time after its components have come in contact with each other. It is therefore highly desirable that the components are mixed just prior to dispension in order to minimize the dwell time of the composition in the mixer. This is accomplished in the present mixer by having the dispension nozzle 31 situated at the end plate of the mixer 12 chamber. It is also of extreme importance that the components are uniformly dispersed in the composition in order to insure uniformity of lining from closure to closure. The mixing unit which is used in this system accomplished these and other objectives. This unit comprises a hollow cylinder 33 of minimum volume within which a cylindrical rotor 32 is mounted. This produces an annular space around the inner walls of the mixing chamber. Two wire helices 35 and 36 each having a spiral reversed as to the other, are directly wound around the rotor one on top of the other. One helix is in the shape of a right handed spiral, while the other helix is in the shape of a left-handed spiral. The extremital ends of each of these spirals are fastened to the rotor. There is, however, a minimum of clearance between these spirals and the inner walls of the cylinder. When the mixer is actuated, these two spirals will continually invade the annular space around the inner wall 34 of the mixing chamber in such a way as to force the mix to travel back and forth in the mixing chamber. It has been found that this mixing device provides a high rate of shear and therefore a very adequate mix of the components is easily achieved. There are many other nozzles which may be used, for instance, the nozzle valve seat could be located directly at the outboard end of the mixer rotor so that the axial displacement of the rotor (which acts as a valve plug or needle control inside a mixer chamber) facilitates the discharge of the mix from the chamber. This action thereby reduces the volume of mixed material in the system between the rotor and the nozzle. Another innovation would be to have the cylinder come to a tapered end which could be removed should a freeze-up occur. In the present mixer the intermittent operation of the dispensing nozzle 31 is controlled by the valve actuator 40. Due to the design of this mixer, the multi-component composition will not remain in the mixer for any substantial time after mixing, but as a precautionary measure the mixer is equipped with a solvent reservoir 39 which is used to flush the mixer when desired.

A constant volume of material must always be dispensed from the mixing unit into each of the individual closures being lined. This is accomplished because the volumetric sum of the increments of the individual components being delivered to the chamber of the mixer unit determines the volume of the lining composition which is dispensed from such chamber. This is because the increments in volume of the individual components being delivered to the chamber provides a positive displacement therein which facilitates the dispension of the lining composition therefrom. One of these components is delivered to the mixer 12, through feed line 14, while the other is delivered to the mixer 12, through feed line 16 in the side of the cylinder 33. Since a component is introduced through feed line 14, a positive pressure with respect to the mixing area is always maintained in order to prevent a reverse flow of the component being introduced through feed line 16. It is also to be noted that reverse flow is also prevented by protrusion 37 on rotor 32. The component being introduced through feed line 14 must always be turned on first. The volume increments of each of the components being delivered to the mixing chamber is precisely controlled by the individual positive displacement pumps in the separate flow circuits, A and B, of the individual components. The volumetric delivery of the volume increments of the individual components can be further improved by equipping feed line 16 with an adjustable shut off needle valve 26' and feed line 14 with an orifice port (not shown). This latter helps to maintain the system under substantially constant back pressure, thus minimizing the duration of hydraulic transients as the flow is diverted from the bypass lines to the mixer.

The constant volume of lining composition which is dispensed from the mixing chamber must consist of components which are present in precise proportions. There must never be a substantial differential in these precise proportions, whether of a transitory nature or otherwise. A steady state of precise proportions, therefore, must always be delivered to the mixing chamber. This is accomplished again by having the individual components of the mix circulating in their individual flow circuits at precisely the volumetric rate at which they should be delivered to the mixer unit, with the system under substantially constant pressure to minimize the effects of hydraulic transients, as aforenoted. There is no sluggishness in the intermittent operation of this system because the time within which a steady state of precise proportions is reached is brought to a minimum. This insures the laying down of a uniform strip of lining with a uniform mix. With this system, the mixing ratio and total volume dispensed are under continuous control. The ratio of the mix may be changed simply by adjusting the system i.e. by accelerating or depreciating the volumetric displacement of the individual pumps. Total valume dispensed may be changed by changing the displacements of all pumps together while keeping the ratio constant.

A further aid in controlling the proportions being delivered to the mixer is by operating the individual flow circuits continuously under pressure. This pressure should be that which is present in the system when the nozzle 31 is open and a steady state has been reached. The pressure in the system may be adjusted to this point by initially opening dispensing valve 11 and by allowing the flow conditions of the system to reach a steady state and then noting the pressure. Then the dispensing valve 11 is closed, allowing valves 23 and 24 on the bypass lines to open. The size of the opening through or the needle lifts on valves 23 and 24 are then adjusted to appropriately throttle the flow of material through the valves and thus regulate the pressure in the system to the pressure which had been previously noted when valve 11 was open (when steady-state conditions had been reached). When properly adjusted, little or no change in pressure is noted when the valve 11 and valves 23 and 24 are open and shut. The switch is made instantaneously with quick starts and clean cutoffs as the dispensing nozzle is open and closed. These adjustments are made to take up the elasticity of the system and so that the system is placed under a constant elastic stress.

We claim:

1. A system for mixing and repetitively dispensing a fluid composition having at least two components comprising, in combination: mixing means equipped with a dispensing valve adapted to repetitively dispense a small uniform volume of said composition in a fixed time interval; reservoirs for each of said components; independent feed conduits connecting said reservoirs to said mixing means; constant volume displacement pumps associated with each of said independent feed conduits and adapted to deliver each component from said reservoirs through their respective feed conduits to said mixing means in predetermined proportions and at a combined pumping rate substantially equal to the instantaneous dispensing rate of said compound through said dispensing valve; individual by-pass return conduits connecting each of said independent feed conduits between said mixing means and said constant volume displacement pumps with each respective reservoir; control valves in each of said individual by-pass return conduits; and control means operatively connected to said dispensing valve and said control valves and adapted to close said control valves when said dispensing valve is open and to open said control valves when said dispensing valve is closed; the hydraulic time constants for each of said independent feed conduits and each of said by-pass return conduits being less than said fixed time interval.

2. The system of claim 1 wherein the junctions of said individual by-pass return conduits with said independent feed conduits are in close proximity to said mixing means.

3. The system of claim 2 wherein each of said independent feed conduits is equipped with a check valve between said junction and said mixing means.

4. The system of claim 1 wherein said dispensing valve and said control valves are equipped and operated by solenoids, and said control menas is an electrical control system.

References Cited in the file of this patent

UNITED STATES PATENTS

| 2,863,649 | Grubb et al. | Dec. 9, 1958 |
| 2,877,929 | Ireland | Mar. 17, 1959 |
| 2,880,455 | Mineah | Apr. 7, 1959 |